(12) United States Patent
Zozgornik (10) Patent No.: US 11,970,060 B2
(45) Date of Patent: Apr. 30, 2024

(54) HEAD-UP DISPLAY AND MEANS OF TRANSPORTATION COMPRISING A HEAD-UP DISPLAY (71) Applicant: Volkswagen Aktiengesellschaft, Wolfsburg (DE)

(72) Inventor: Steffen Zozgornik, Leverkusen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/332,675

(22) Filed: Jun. 9, 2023

(65) Prior Publication Data

US 2023/0415576 A1 Dec. 28, 2023

(30) Foreign Application Priority Data

Jun. 23, 2022 (DE) .......................... 102022206293.0

(51) Int. Cl.
*G09G 5/00* (2006.01)
*B60K 35/60* (2024.01)
(Continued)

(52) U.S. Cl.
CPC ............ *B60K 35/60* (2024.01); *G02B 5/0816* (2013.01); *G02B 27/0101* (2013.01);
(Continued)

(58) Field of Classification Search
CPC ............ B60K 37/02; B60K 2370/1529; B60K 2370/167; B60K 2370/334; G02B 5/0816;
(Continued)

(56) References Cited

U.S. PATENT DOCUMENTS 11,022,809 B1 * 6/2021 Richards ................. G06F 3/013
2017/0235136 A1 8/2017 Kim et al.
(Continued)

FOREIGN PATENT DOCUMENTS

CN 110412764 A 11/2019
CN 211375182 U 8/2020
(Continued)

OTHER PUBLICATIONS

Priority German Appln. No. DE102022206293.0. Examination Report (Feb. 16, 2023).

*Primary Examiner* — Jennifer T Nguyen
(74) *Attorney, Agent, or Firm* — Peter Zura; LOZA & LOZA, LLP (57) ABSTRACT A head-up display for a transportation vehicle. The head-up display includes an imaging unit for generating an image, and an optical system for projecting the image onto a projection surface. The optical system includes at least a first mirror, a curved second mirror arranged adjacent to the first mirror, and a selectively reflective element configured in an optical path between the first mirror and the second mirror. The optical system is configured such that light emitted from the imaging unit is directed to pass through the selectively reflective element, reflected off the first mirror towards the selectively reflective element, reflected by the selectively reflective element towards the second mirror, and reflected by the second mirror towards the selectively reflective element, and passed through to be directed to the projection surface.

18 Claims, 7 Drawing Sheets (51) Int. Cl.
  *G02B 5/08* (2006.01)
  *G02B 27/01* (2006.01)
  *G03B 21/28* (2006.01)
  *B60K 35/23* (2024.01)
  *B60K 35/28* (2024.01)

(52) U.S. Cl.
  CPC .............. *G03B 21/28* (2013.01); *B60K 35/23* (2024.01); *B60K 35/28* (2024.01); *B60K 2360/167* (2024.01); *B60K 2360/334* (2024.01); *G02B 2027/0118* (2013.01)

(58) Field of Classification Search
  CPC ........ G02B 27/0101; G02B 2027/0118; G03B 21/28
  USPC ............................................................ 345/7
  See application file for complete search history.

(56) References Cited

U.S. PATENT DOCUMENTS

| | | |
|---|---|---|
| 2017/0336628 A1 | 11/2017 | Kim et al. |
| 2018/0157036 A1* | 6/2018 | Choi .................... G06T 19/006 |
| 2020/0026073 A1 | 1/2020 | Nambara |
| 2021/0033863 A1* | 2/2021 | Hong ................. G02B 27/0101 |
| 2021/0382304 A1* | 12/2021 | You .................... G02B 27/0103 |
| 2021/0389621 A1* | 12/2021 | Huang ................ G02F 1/13718 |
| 2023/0251547 A1* | 8/2023 | Cheng ..................... G02B 5/32 349/33 |

FOREIGN PATENT DOCUMENTS

| | | |
|---|---|---|
| CN | 212675279 U | 3/2021 |
| DE | 102011075884 A1 | 11/2012 |
| JP | 201982558 A | 10/2019 |
| KR | 101868684 B1 | 7/2018 |
| WO | 2019087615 A1 | 5/2019 |

* cited by examiner

HEAD-UP DISPLAY AND MEANS OF TRANSPORTATION COMPRISING A HEAD-UP DISPLAY

RELATED APPLICATIONS

The present application claims priority to German Patent App. No. DE 10 2022 206 293.0, to Steffen Zozgornik, filed Jun. 23, 2022, the contents of which is incorporated by reference in its entirety herein.

FIELD OF TECHNOLOGY

The present disclosure relates to a head-up display, such as a head-up display for a means of transportation. The present disclosure further relates to a means of transportation comprising such a head-up display.

BACKGROUND

With the continuous development of virtual and augmented reality technologies and applications, these are also finding their way into automobiles. Augmented Reality (AR) is the enrichment of the real world with virtual elements that are correctly registered in the correct location in three-dimensional space and allow real-time interaction. Since the term "Augmented Reality" has gained acceptance over the term "Extended Reality" (erweiterte Realität) in German-speaking professional circles, the former will be used in the following.

One possible technical implementation for enriching the driver's space with virtual extensions is the head-up display. A head-up display, also known as a HUD, is a display system that allows the viewer to maintain his or her line of sight by superimposing the displayed content over his or her field of view. Originally used primarily in the aviation industry due to their complexity and cost, these systems are now being used in large numbers in the automotive industry.

Head-up displays generally consist of a picture generating unit or PGU, an optical system, and a projection surface. The PGU generates the picture using at least one display element. The optical system projects the picture onto the projection surface. The projection surface is a partially reflecting, translucent pane. The viewer thus sees the content displayed by the picture generating unit as a virtual picture and, at the same time, the real world behind the pane. In the automotive sector, the windshield is often used as a projection surface, and its curved shape must be taken into account in the display. Alternatively, an additional pane of glass or plastic is sometimes used, placed between the driver and the windshield on the dashboard. Due to the interaction of the optical system and the projection surface, the virtual picture is an enlarged representation of the picture produced by the picture generating unit. The optical overlay of the display and the driving scene means that fewer head and eye movements are required to read the information. In addition, the adaptation effort for the eyes is reduced because less or no accommodation is required depending on the virtual distance of the display.

The optical system of a head-up display, in particular one of an AR head-up display or a 3D head-up display, generally comprises two opposing mirrors for folding the beam path.

For example, US 2020/0026073 A1 describes a head-up display comprising a liquid crystal display and a projection unit. Linearly polarized display light is emitted from the projection unit. The display light is directed to a windshield through an optical path provided by a light guide unit. The light guide unit includes a first phase shifter, a reflecting element, a magnifying mirror, and a linear polarizer. The first phase shifter ensures that ambient light does not interfere with the picture.

In the known configurations, the mirrors must be spaced far enough apart so that they do not block the light paths to the projection surface and from the picture generating unit to the other mirror. This results in a large volume of the entire unit.

SUMMARY

Aspects of the present disclosure are to provide solutions for realizing a head-up display with a reduced installation space.

Some aspects are disclosed by a head-up display having the features of the independent claims and include a means of transportation utilizing the head-up display. Preferred embodiments of the present disclosure are the subject matter of the dependent claims.

According to one aspect of the present disclosure, a head-up display comprises a picture generating unit for generating a picture and an optical system for projecting the picture onto a projection surface. The optical system comprises at least a first mirror, a second mirror, and a selectively reflecting element. The selectively reflecting element is arranged in the optical path between the first mirror and the second mirror.

In some examples, a selectively reflecting element is used to provide additional folding of the beam path. This allows the volume of the overall system to be reduced. The selectively reflecting element is designed to allow light to pass through it unimpeded on its way from the picture generating unit to the first mirror and on its way from the second mirror to the projection surface. This prevents the light paths from being blocked. At the same time, the selectively reflecting element provides additional optically active surfaces at locations in the beam path where they could not be positioned without the selectively reflecting element because they would cause shadowing between other surfaces in the beam path.

In some examples, the selectively reflecting element is a direction-selective reflector that acts as a mirror for a specific angular range and is transparent for other angular ranges. Preferably, the direction-selective reflector acts as a mirror for at least the 40°-60° range and is transparent for at least the 0°-25° range. By hitting the selectively reflecting element at a small angle, the light emitted by the picture generating unit is not reflected by it and reaches the first mirror unhindered. The first mirror is arranged in such a way that the light reflected by the first mirror hits the selectively reflecting element at a much larger angle and is reflected by it in the direction of the second mirror. The second mirror is in turn arranged so that the light reflected by it hits the selectively reflecting element at a small angle and thus passes unhindered to the projection surface.

In some examples, the direction-selective reflector is configured as a reflecting volume grating. The directional selectivity of the reflector can be achieved by different solutions. In one example, a reflecting volume grating is used. Such a grating can be fabricated as a foil, which simplifies handling. If the volume grating is symmetrical, i.e., if the angle of incidence and the angle of reflection are the same, the grating has no dispersion. This has a positive effect on the selection of suitable light sources.

In some examples, the reflecting volume grating may be configured with an additional optical function. For example, the reflecting volume grating may have a lens function. By combining the property of the reflecting volume grating to form the optical path with an additional optical function, an additional optical element that may be required in the optical path can be eliminated. For example, the lens function allows for additional aberration correction in imaging.

In some examples, the direction-selective reflector may be configured as a substrate having a multilayer thin film coating. In one example, an interference-based coating may be used for achieving the directional selectivity of the reflector. This coating is designed to be transparent to frequency bands for specific angular ranges and reflecting for others. The use of thin film coatings has the advantage that they can be manufactured very precisely with the desired properties.

In some examples, at least one portion of the substrate may be configured as a lens. The substrate on which the thin film coating is located can itself be designed as a refractive lens, e.g., for additional aberration correction. The reflecting side can remain planar or cylindrical, e.g., to accommodate coatings on foil.

According to some examples, the selectively reflecting element is a polarization-selective reflector. In this case, a quarter wave plate is preferably arranged in front of each of the first mirror and the second mirror. For example, the selectively reflecting element may have a coating that reflects S-polarized light but transmits P-polarized light. Complementarily, a quarter wave plate is then positioned in front of each of the first mirror and the second mirror to rotate the polarization of the light along the path by the double passage through the quarter wave plate.

In some examples, the first mirror and the second mirror are positioned side by side. The fact that the selectively reflecting element provides an additional folding of the beam path allows the two mirrors to be positioned side by side. The volume of the system can be further reduced by this arrangement.

In some examples, the first mirror and the second mirror are integrally formed. By allowing the two mirrors to be arranged side by side, it is possible to produce the two mirrors in a single piece. Typically, the mirrors are free-form mirrors. On the one hand, the one-piece configuration eliminates a manufacturing step, and on the other hand, it also eliminates the adjustment effort for the relative alignment of the mirrors during the assembly of the complete system.

In some examples, the selectively reflecting element is oriented substantially vertically. Approximately vertical orientation means that the reflecting surface is arranged at an angle of less than 45° relative to the vertical. Tilting the selectively reflecting element to an approximately vertical position is advantageous for avoiding interfering reflections of sunlight.

In some examples, the selectively reflecting element is curved. The selectively reflecting element may be planar, but alternatively may have a curvature. In materials manufactured as a film, this curvature is preferably cylindrical. However, a more complex configuration is also possible, acting as a free-form mirror, for example.

In some examples, at least one additional lens is arranged adjacent to the selectively reflecting element. A separate lens may be positioned on or near the reflector, for example, to provide additional aberration correction in the imaging This would not be possible in the unfolded system without the selectively reflecting element at this location, since the lens would affect a different beam path.

As disclosed herein, a head-up display according to the present disclosure may be advantageously utilized in a means of transportation. The means of transportation, for example, may be a motor vehicle, such as a passenger car or a commercial vehicle. The use of the solution according to the present disclosure has the advantage that the head-up display requires a reduced installation space and thus, the arrangement in the means of transportation is simplified.

BRIEF DESCRIPTION OF THE DRAWINGS

Further features of the present disclosure will become apparent from the following description and the appended claims in conjunction with the figures.

DETAILED DESCRIPTION

For a better understanding of the principles of the present disclosure, embodiments of the present disclosure will be explained in more detail below with reference to the figures. It is to be understood that the present disclosure is not limited to these embodiments and that the features described may be combined or modified without departing from the scope of the present disclosure as defined in the appended claims.

Figure 1:
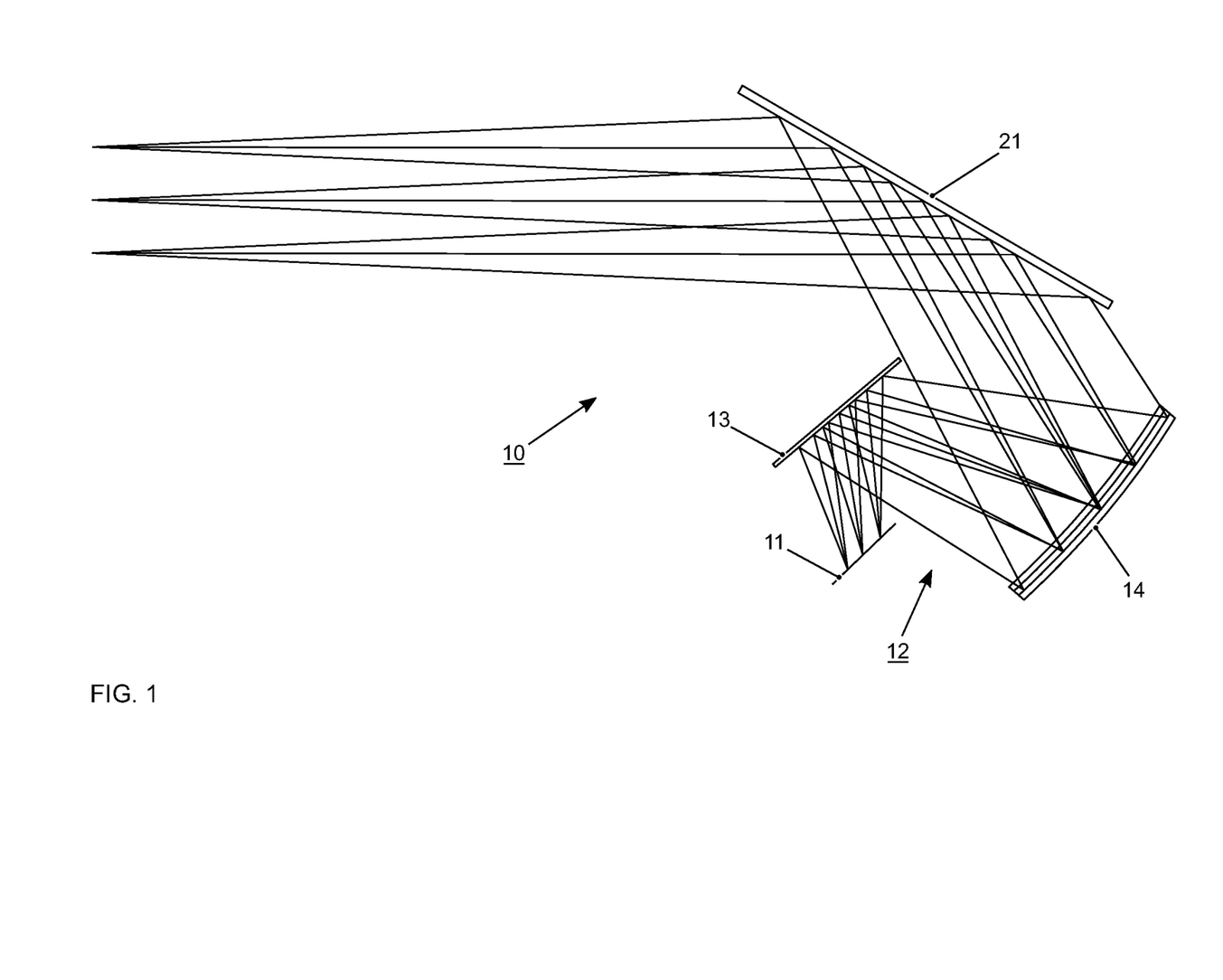
FIG. 1 is a schematic of a head-up display of the prior art.

FIG. 1 is a schematic of a head-up display 10 according to the prior art. In the example shown, it is a head-up display 10 for a means of transportation, such as a motor vehicle. The head-up display 10 can be used to display content on a projection surface 21 of the motor vehicle, for example, on the windshield or on an additional glass or plastic pane arranged on the dashboard between the driver and the windshield. The displayed contents are generated by a picture generating unit 11 and projected onto the projection surface 21 by means of an optical system 12 so that they can be perceived by a viewer. Typically, the projection takes place in an area of the windshield above the steering wheel. The head-up display 10 is typically installed in a dashboard of a motor vehicle. The optical system 12 includes a first mirror 13 and a second mirror 14. The first mirror 13 provides a folding of the beam path and serves to ensure that the path traveled by the light between the picture generating unit 11 and the second mirror 14 is long and yet the optical system 12 is compact. The picture generating unit 11 may comprise at least one light source and a spatial light modulator.

Figure 2:
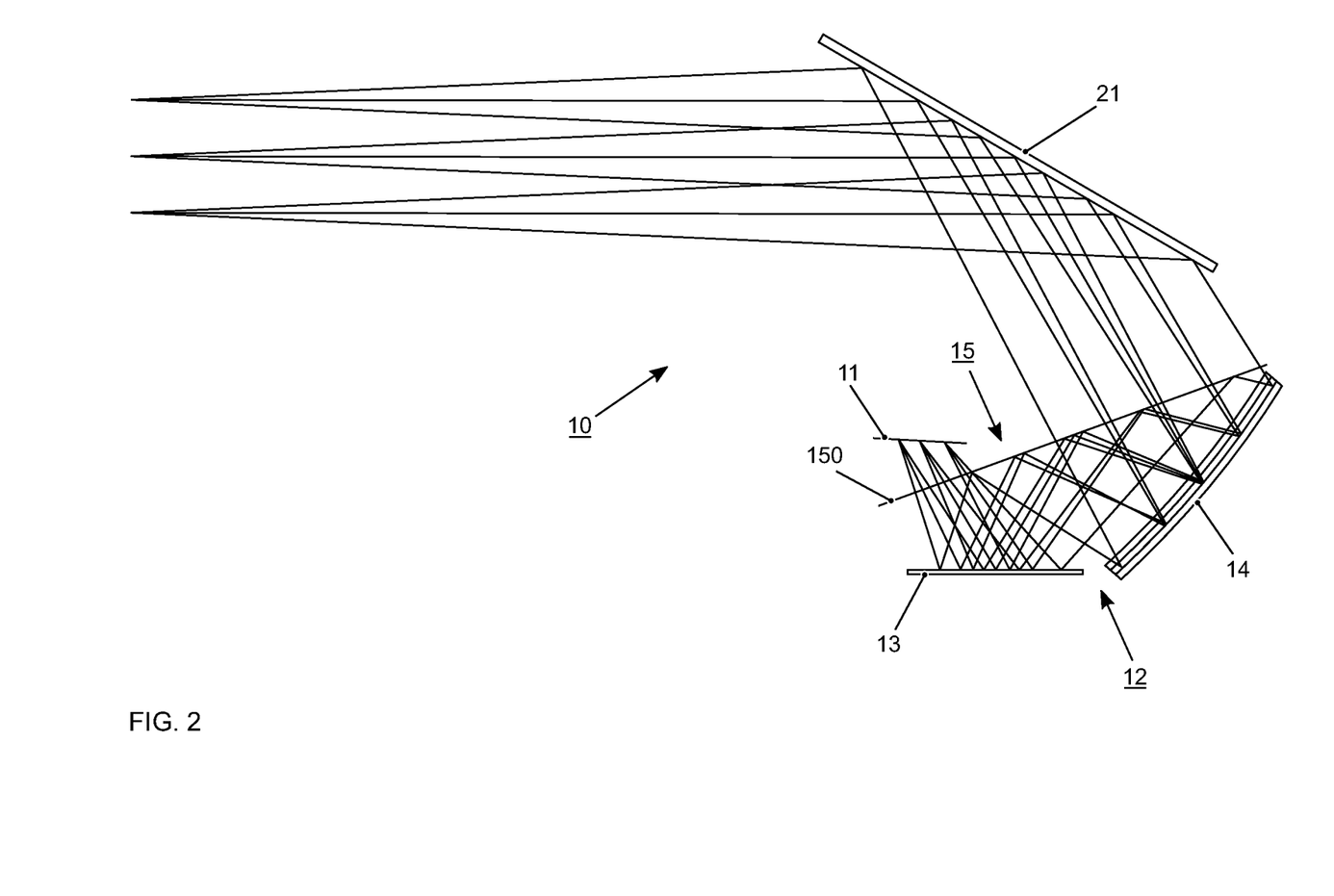
FIG. 2 is a schematic of a head-up display having a horizontally arranged direction-selective reflector, according to some aspects of the present disclosure.

FIG. 2 is a schematic of a head-up display 10 having a horizontally arranged direction-selective reflector 150. In the example shown, it is again a head-up display 10 for a motor vehicle with a picture generating unit 11 for generating a picture and an optical system 12 for projecting the picture onto a projection surface 21. In this case, too, the optical system 12 includes a first mirror 13 and a second mirror 14. However, in the optical path between the first mirror 13 and the second mirror 14, a direction-selective reflector 150 is arranged as a selectively reflecting element 15 which acts as a mirror for a specific angular range, e.g., in the range of 40°-60°, and is transparent for other angular ranges, e.g., in the range of 0°-25°. In the example shown, the direction-selective reflector 150 is arranged approximately horizontally, i.e., the reflecting surface of the direction-selective reflector 150 is arranged at an angle of less than 45° relative to the horizontal.

Since the light emitted by the picture generating unit 11 hits the direction-selective reflector 150 at small angles, it is not reflected by the direction-selective reflector 150 and passes unhindered to the first mirror 13. The first mirror 13 is arranged so that the light reflected by it hits the direction-selective reflector 150 at substantially larger angles and is reflected by the direction-selective reflector 150 in the direction of the second mirror 14. The second mirror 14, in turn, is arranged so that the light reflected by it hits the direction-selective reflector 150 at small angles and thus reaches the projection surface 21 unhindered.

The direction-selective reflector 150 is thus used to cause an additional folding in the beam path. At the same time, blocking of the light paths is avoided. The additional folding of the beam path makes it possible to arrange the two mirrors 13, 14 side by side and thus to achieve a volume reduction of the overall system. In particular, the two mirrors 13, 14 can be formed in a single piece.

The directional selectivity of the reflector 150 can be achieved using various configurations. In one example, a reflecting volume grating is used. Such a grating can be made as a foil, for example. In a second solution, the direction-selective reflector 150 is formed as a substrate with a multilayer thin film coating.

The picture generating unit 11 may include at least one light source and a spatial light modulator. For example, it may be a TFT display (TFT: thin film transistor), an OLED display (OLED: organic light emitting diode), or a micro-LED display (LED: light emitting diode). A projected picture from a transmissive or reflecting display or the Fourier image from a phase display can also be used at this location.

Figure 3:
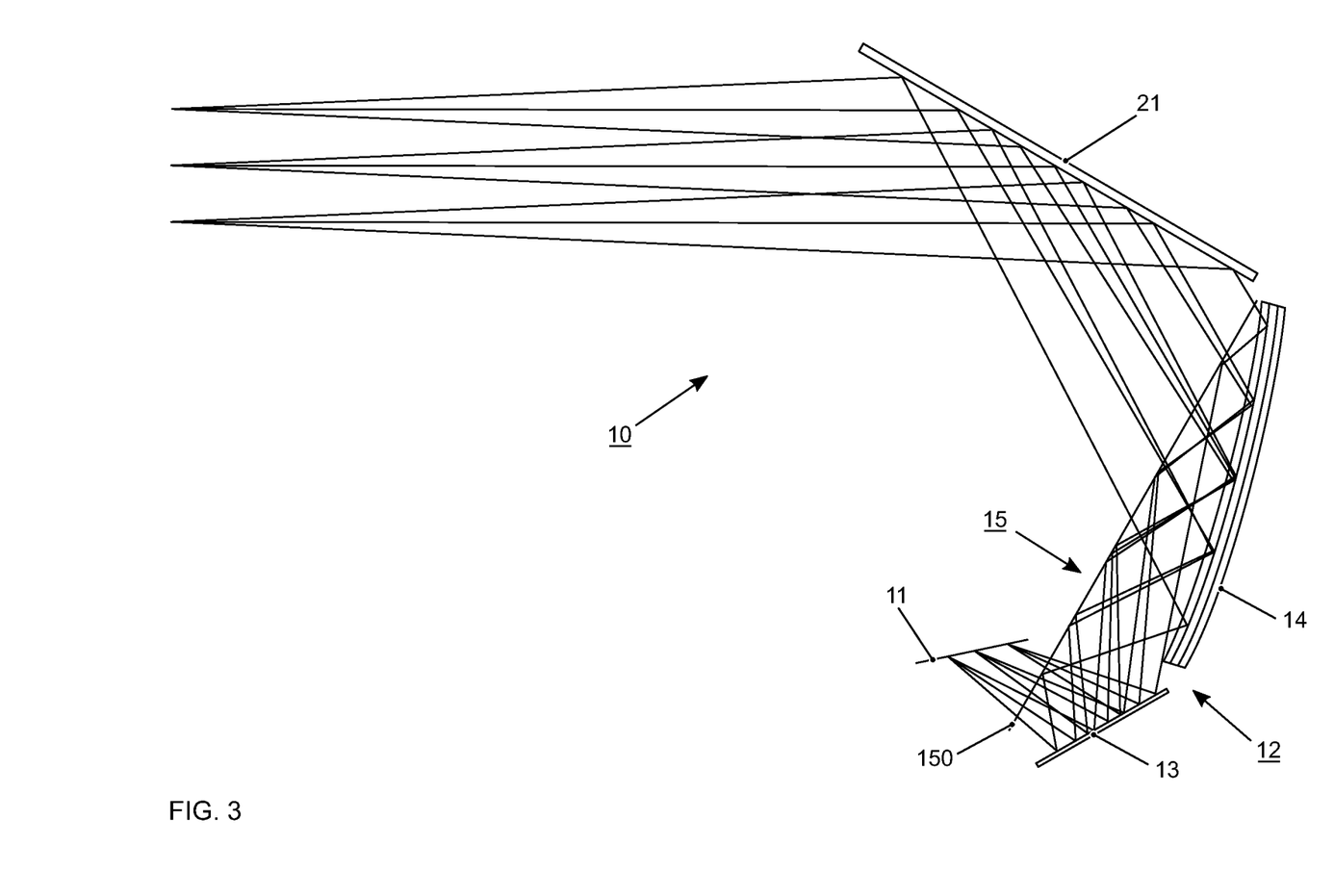
FIG. 3 is a schematic of a head-up display having a vertically arranged direction-selective reflector, according to some aspects of the present disclosure.

FIG. 3 is a schematic of a head-up display 10 having a vertically arranged direction-selective reflector 150. The structure of the head-up display 10 is substantially the same as the head-up display 10 of FIG. 2. However, in this embodiment, the direction-selective reflector 150 is arranged substantially vertically as a selectively reflecting element 15, i.e., the reflecting surface of the direction-selective reflector 150 is arranged at an angle of less than 45° relative to the vertical. Tilting the direction-selective reflector 150 to an approximately vertical position is advantageous for avoiding interfering reflections of sunlight. As in the embodiment of FIG. 2, the direction-selective reflector 150 acts as a mirror for a specific angular range, e.g., in the range of 40°-60°, while being transparent for other angular ranges, e.g., in the range of 0°-25°.

Also, in this example, the light emitted by the picture generating unit 11 hits the direction-selective reflector 150 at small angles. It is therefore not reflected by it and passes unhindered to the first mirror 13. The first mirror 13 is arranged so that the light reflected by it hits the direction-selective reflector 150 at substantially larger angles and is reflected by the direction-selective reflector 150 in the direction of the second mirror 14. The second mirror 14, in turn, is arranged so that the light reflected by it hits the direction-selective reflector 150 at smaller angles and thus reaches the projection surface 21 unhindered. Due to the additional folding of the beam path caused by the direction-selective reflector 150, it is also possible here to arrange the two mirrors 13, 14 side by side. In particular, the two mirrors 13, 14 can again be formed in a single piece.

Figure 4:
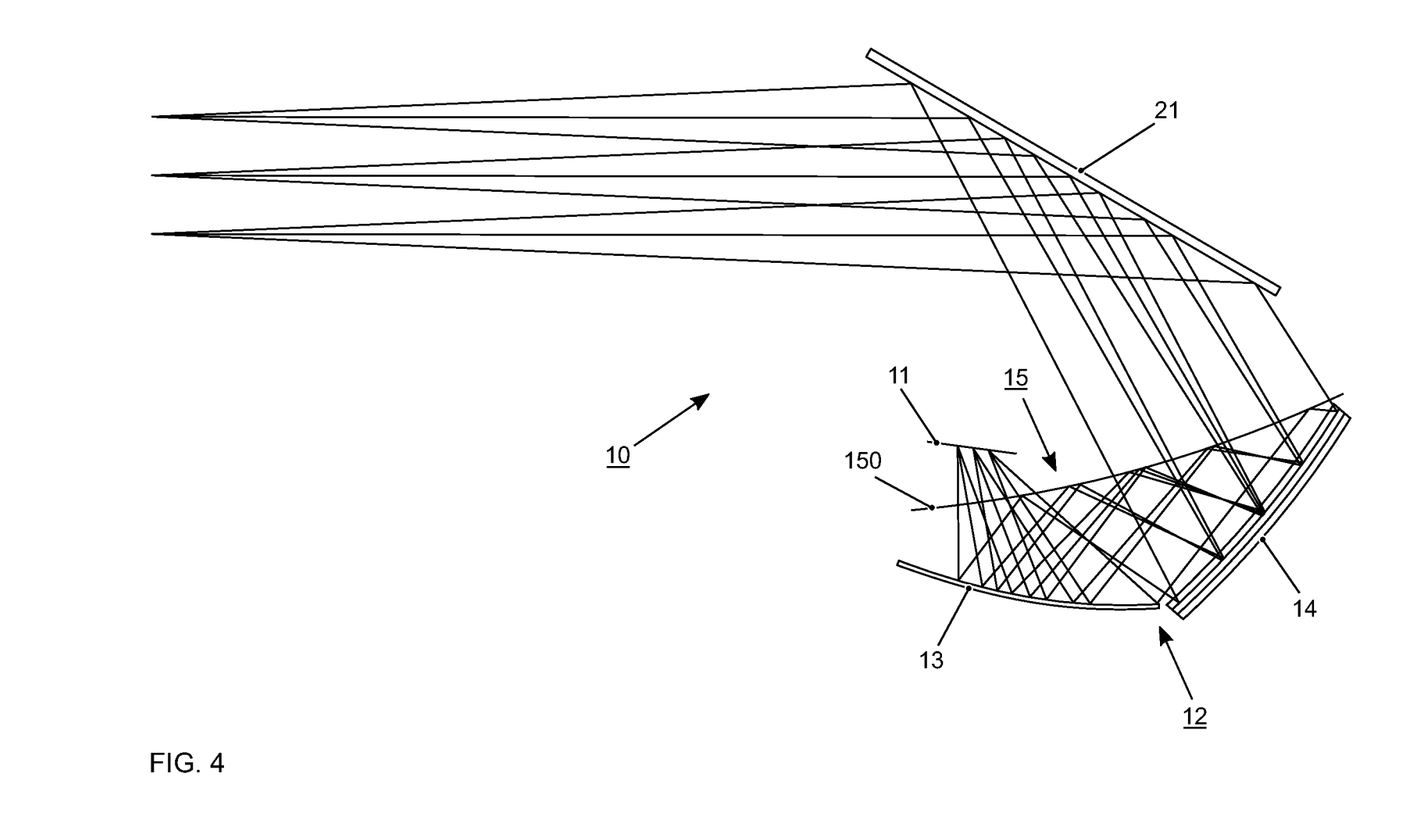
FIG. 4 is a schematic of a head-up display having a curved direction-selective reflector, according to some aspects of the present disclosure.

FIG. 4 is a schematic of a head-up display 10 having a curved direction-selective reflector 150 as a selective reflecting element 15. The structure of the head-up display 10 is substantially the same as the head-up display 10 of FIG. 2. However, in this embodiment, the direction-selective reflector 150 is curved. Preferably, this curvature is cylindrical, e.g., for use with materials manufactured as a film. However, a more complex configuration is also possible, acting as a free-form mirror, for example. As in the embodiment of FIG. 2, the direction-selective reflector 150 acts as a mirror for a specific angular range, e.g., in the range of 40°-60°, while being transparent for other angular ranges, e.g., in the range of 0°-25°.

Also in this embodiment, the light emitted by the picture generating unit 11 hits the direction-selective reflector 150 at small angles. It is therefore not reflected by it and passes unhindered to the first mirror 13. In this embodiment, the first mirror 13 also has a curvature and is arranged in such a way that the light reflected by it hits the direction-selective reflector 150 at much larger angles and is reflected by the direction-selective reflector 150 in the direction of the second mirror 14. The second mirror 14, in turn, is arranged so that the light reflected by it hits the direction-selective reflector 150 at smaller angles and thus reaches the projection surface 21 unhindered. Due to the additional folding of the beam path caused by the direction-selective reflector 150, it is also possible here to arrange the two mirrors 13, 14 side by side. In particular, the two mirrors 13, 14 can again be formed in a single piece.

Figure 5:
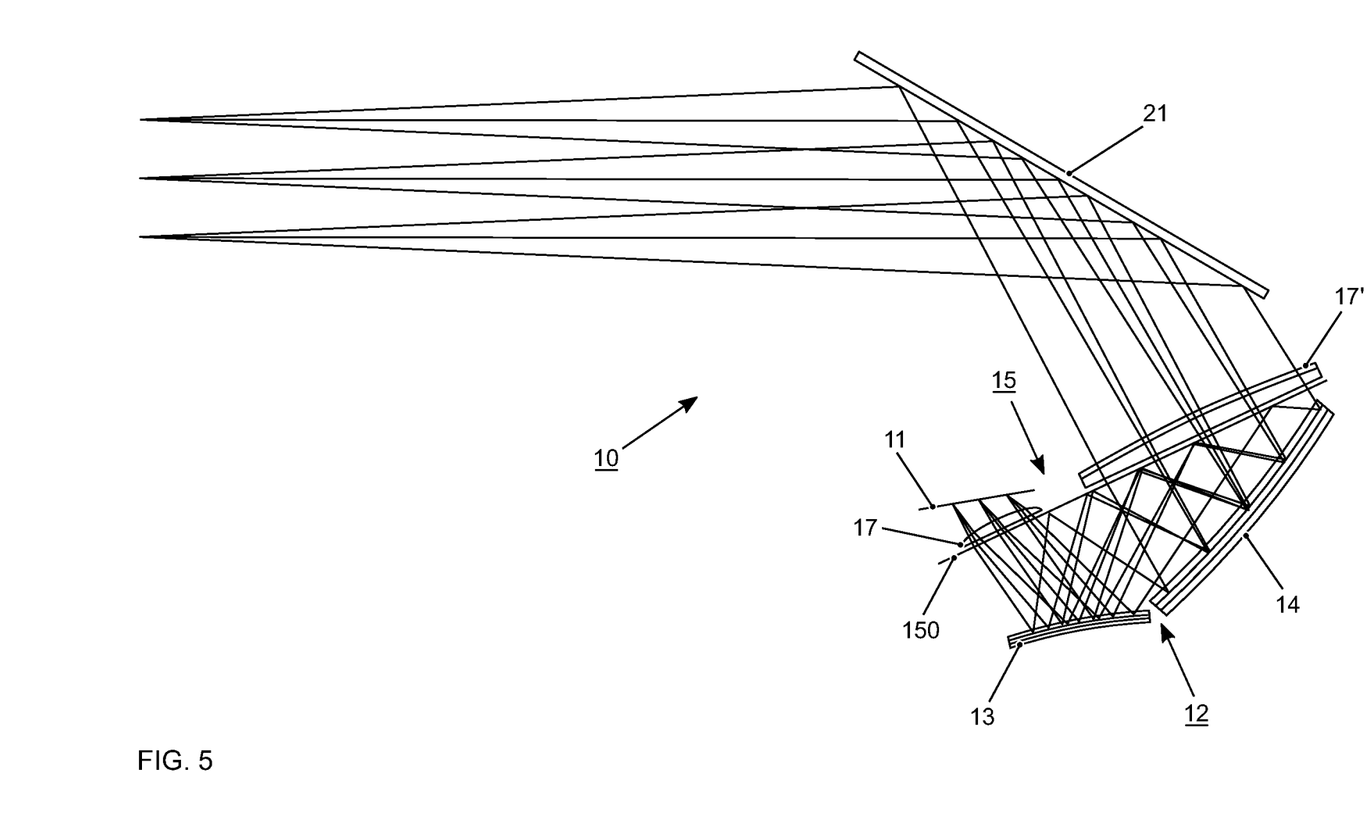
FIG. 5 is a schematic of a head-up display having a direction-selective reflector and additional lenses, according to some aspects of the present disclosure.

FIG. 5 is a schematic of a head-up display 10 having a direction-selective reflector 150 as a selectively reflecting element 15 and additional lenses 17, 17'. The structure of the head-up display 10 is substantially the same as the head-up display 10 of FIG. 2. As in the embodiment of FIG. 2, the direction-selective reflector 150 acts as a mirror for a specific angular range, e.g., in the range of 40°-60°, while being transparent for other angular ranges, e.g., in the range of 0°-25°. The direction-selective reflector 150 provides additional optically active surfaces in the beam path, on which, in this example, two additional lenses 17, 17' are arranged. These can be used, for example, for additional aberration correction in the picture.

As in the previous embodiments, the light emanating from the picture generating unit 11 hits the direction-selective reflector 150 at small angles. It is therefore not reflected by it and passes unhindered to the first mirror 13. In the example shown, the first mirror 13 also has a curvature and is arranged in such a way that the light reflected by it hits the direction-selective reflector 150 at much larger angles and is reflected by the direction-selective reflector 150 in the direction of the second mirror 14. The second mirror 14, in turn, is arranged so that the light reflected by it hits the direction-selective reflector 150 at smaller angles and thus reaches the projection surface 21 unhindered. Due to the additional folding of the beam path caused by the direction-selective reflector 150, it is also possible here to arrange the two mirrors 13, 14 side by side. In particular, the two mirrors 13, 14 can again be formed in a single piece.

Figure 6:
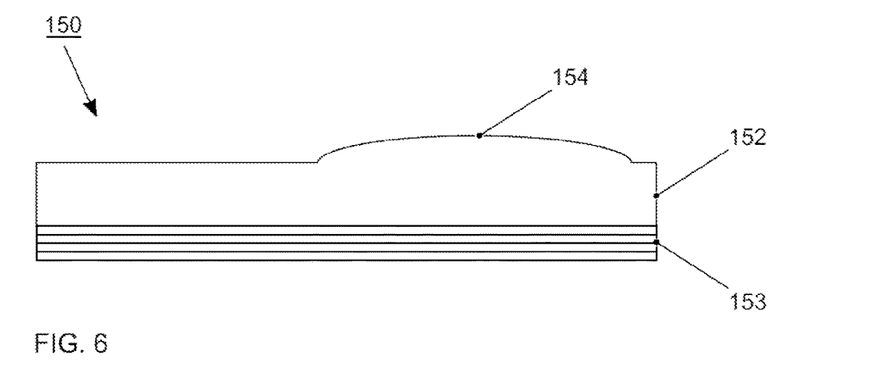
FIG. 6 is a schematic of an exemplary structure of a direction-selective reflector, according to some aspects of the present disclosure.

FIG. 6 is a schematic of an exemplary structure of a direction-selective reflector 150. The direction-selective reflector 150 comprises a substrate 152 provided with a coating 153. The coating 153 may be, for example, a multilayer thin film coating. This coating is designed to be transparent to frequency bands for specific angular ranges and reflecting for others. The layers of the coating 153 may be applied directly to the substrate 152, but the coating 153 may also be fabricated in the form of a film and then applied as a whole to the substrate 152.

In the example shown, the substrate 152 is planar; alternatively, it may have a curvature. If the coating 153 is to be applied as a film, this curvature is preferably cylindrical. However, a more complex configuration is also possible, acting as a free-form mirror, for example. In addition, in FIG. 6, a portion of the substrate 152 is configured as a lens 154, e.g., for additional aberration correction.

Figure 7:
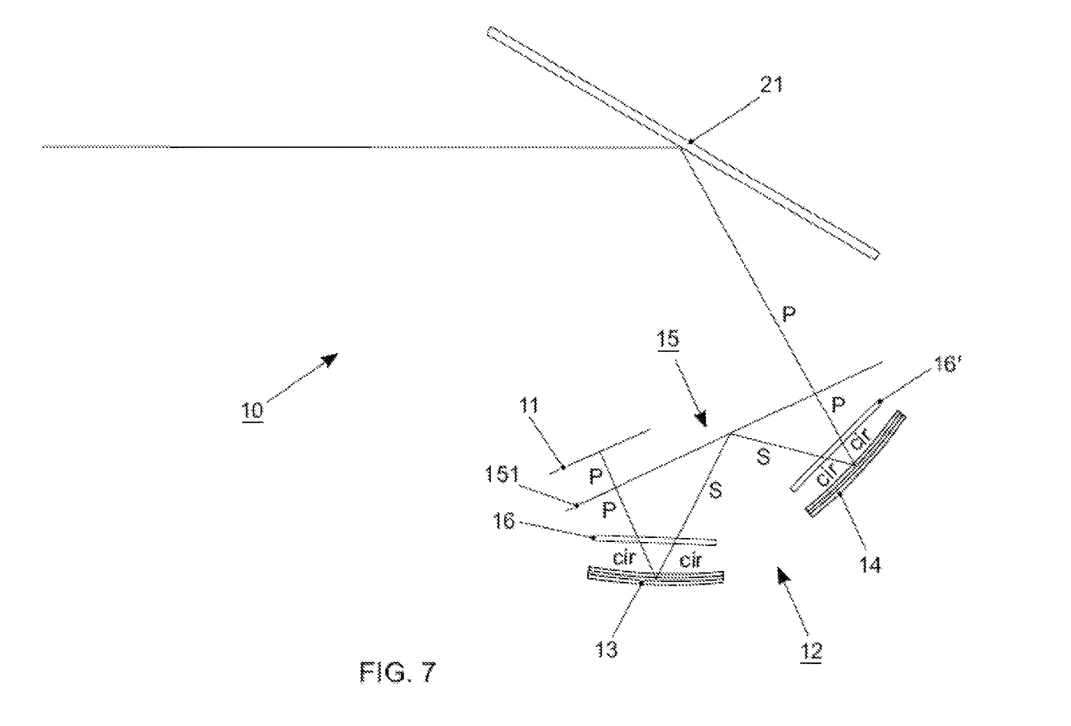
FIG. 7 is a schematic of a head-up display having a polarization-selective reflector, according to some aspects of the present disclosure.

FIG. 7 is a schematic of a head-up display 10 having a polarization-selective reflector 151. In this approach to implementing a selective reflector 15, polarization selectivity is used instead of directional selectivity. In the example shown, the polarization-selective reflector 151 is configured, for example, by a suitable coating, to reflect S-polarized light but to transmit P-polarized light. The light emitted by the picture generating unit 11 is P-polarized and can therefore pass through the polarization-selective reflector 151 unhindered. It passes through a quarter wave plate 16 arranged in front of the first mirror 13 so that the light is circularly polarized. After being reflected by the first mirror 13, the circularly polarized light passes through the quarter wave plate 16 again, so that it is now S-polarized. It is therefore further reflected by the polarization-selective reflector 151 in the direction of the second mirror 14. A further quarter wave plate 16' is arranged in front of the second mirror 14. The light reflected on the polarization-selective reflector 151 after reflection from the second mirror 14 is therefore P-polarized again and can pass through the polarization-selective reflector 151 unhindered in the direction of the projection surface 21.

If the picture generating unit 11 emits S-polarized light, the polarization-selective reflector 151 must be adjusted accordingly. In this case, it must reflect P-polarized light but transmit S-polarized light.

Figure 8:
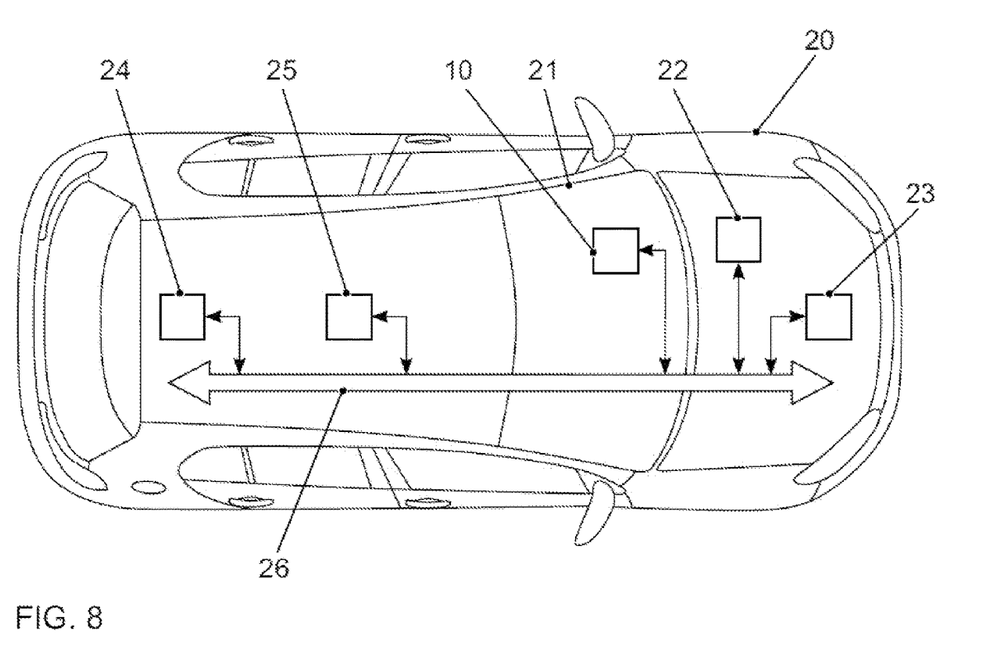
FIG. 8 is a schematic representation of a means of transportation utilizing a head-up display, according to some aspects of the present disclosure.

FIG. 8 is a schematic representation of a means of transportation 20 utilizing a head-up display, according to some aspects of the present disclosure. The means of transportation 20 in this example is a motor vehicle. The motor vehicle has a head-up display 10 according to the present disclosure. In this example, the windshield of the motor vehicle serves as the projection surface 21. Preferably, the display device 42 is designed to be touch sensitive.

Further components of the motor vehicle are an assistance system 22, an environmental sensor system 23 for detecting environmental information such as cameras, radar sensors, lidar sensors, or ultrasonic sensors, and a data transmission unit 24. The data transmission unit 24 can be used, for example, to establish a connection to a backend, e.g., to transmit collected data or to retrieve updated software for the components of the motor vehicle. A memory 25 is provided for storing data. Data are exchanged between the various components of the vehicle via a network 26.

LIST OF REFERENCE SIGNS

10 Head-up display
11 Picture generating unit
12 Optical system
13 First mirror
14 Second mirror
15 Selectively reflecting element
16, 16' Quarter wave plate
17, 17' Lens
20 Means of transportation
21 Projection surface
22 Assistance system
23 Environmental sensor system
24 Data transmission unit
25 Memory
26 Network
150 Direction-selective reflector
151 Polarization-selective reflector
152 Substrate
153 Coating
154 Lens

The invention claimed is:

1. A head-up display, comprising:
an imaging unit for generating an image; and
an optical system for projecting the image onto a projection surface, wherein the optical system comprises at least a first minor, a curved second minor arranged adjacent to the first minor, and a selectively reflective element configured in an optical path between the first mirror and the second minor, wherein the reflective element comprises a direction-selective reflector configured to reflect light for a first range of angles, and configured to be transparent for a second range of angles, and wherein the optical system is configured such that light emitted from the imaging unit is:
directed to pass through the selectively reflective element;
reflected off the first mirror towards the selectively reflective element;
reflected by the selectively reflective element towards the second mirror; and
reflected by the second minor towards the selectively reflective element, and passed through to be directed to the projection surface.

2. The head-up display according to claim 1, wherein the first range of angles comprise 40° to 60° and the second range of angles comprise 0° to 25°.

3. The head-up display according to claim 1, wherein the direction- selective reflector is configured as a reflective volume grating.

4. The head-up display according to claim 3, wherein the reflective volume grating comprises an additional optical function.

5. The head-up display according to claim 4, wherein the reflective volume grating comprises a lens function.

6. The head-up display according to claim 1, wherein the direction-selective reflector comprises a substrate with a multilayer thin-film coating.

7. The head-up display according to claim 6, wherein at least a portion of the substrate is configured as a lens.

8. The head-up display according to claim 1, wherein the selectively reflective element comprises a polarization-selective reflector, and wherein a quarter-wave plate is configured in front of each of the first minor and the second mirror.

9. The head-up display according to claim 1, wherein the selectively reflective element is substantially vertically aligned.

10. The head-up display according to claim 1, wherein the selectively reflective element is curved.

11. A method of operating a head-up display, comprising:
projecting, via an optical system, an image for a projection surface, wherein the optical system comprises at least a first minor, a curved second minor arranged adjacent to the first minor, and a selectively reflective element configured in an optical path between the first mirror and the second minor, wherein the reflective element comprises a direction-selective reflector configured to reflect light for a first range of angles, and configured to be transparent for a second range of angles;
directing, via the optical system, emitted light from the image to pass through the selectively reflective element;
reflecting, via the optical system, the emitted light from the image off the first minor towards the selectively reflective element;
reflecting, via the optical system, the emitted light from the image by the selectively reflective element towards the second mirror; and
reflecting, via the optical system, emitted light from the image by the second mirror towards the selectively reflective element, and passing the emitted light through the selectively reflective element to be directed to the projection surface.

12. The method according to claim 11, wherein the first range of angles comprise 40° to 60° and the second range of angles comprise 0° to 25°.

13. The method according to claim 11, wherein the direction-selective reflector is configured as a reflective volume grating.

14. The method according to claim 11, wherein the direction-selective reflector comprises a substrate with a multilayer thin-film coating.

15. The method according to claim 14, wherein at least a portion of the substrate is configured as a lens.

16. The method according to claim 11, wherein the selectively reflective element comprises a polarization-selective reflector, and wherein a quarter-wave plate is configured in front of each of the first mirror and the second minor.

17. The method according to claim 11, wherein the selectively reflective element is curved.

18. A vehicle, comprising:
a head-up display, comprising:
an imaging unit for generating an image; and
an optical system for projecting the image onto a projection surface for the vehicle, wherein the optical system comprises at least a first minor, a curved second minor arranged adjacent to the first mirror, and a selectively reflective element configured in an optical path between the first minor and the second mirror, wherein the reflective element comprises a direction-selective reflector configured to reflect light for a first range of angles, and configured to be transparent for a second range of angles, and
wherein the optical system is configured such that light emitted from the imaging unit is:
directed to pass through the selectively reflective element;
reflected off the first mirror towards the selectively reflective element;
reflected by the selectively reflective element towards the second mirror; and
reflected by the second minor towards the selectively reflective element, and passed through to be directed to the projection surface.

* * * * *